United States Patent [19]
van der Pol

[11] Patent Number: 5,438,867
[45] Date of Patent: Aug. 8, 1995

[54] PROCESS FOR MEASURING THE LEVEL OF FLUID IN A TANK ACCORDING TO THE RADAR PRINCIPLE

[75] Inventor: Ronald van der Pol, Venlo, Netherlands

[73] Assignee: Krohne Messtechnik GmbH & Co. KG., Germany

[21] Appl. No.: 132,047

[22] Filed: Oct. 5, 1993

[30] Foreign Application Priority Data

Oct. 5, 1992 [DE] Germany .................. 42 33 324.5

[51] Int. Cl.⁶ ............................................. G01F 23/28
[52] U.S. Cl. ................................. 73/290 V; 342/124
[58] Field of Search ............... 324/637, 644; 364/561, 364/562; 342/124; 73/290 V

[56] References Cited

U.S. PATENT DOCUMENTS

| 4,114,441 | 9/1978 | Magri ........................ 73/290 V |
| 4,641,139 | 2/1987 | Edvardsson ................. 73/290 R X |
| 4,661,817 | 4/1987 | Bekkadal et al. ............ 73/290 R X |
| 4,665,403 | 5/1987 | Edvardsson ................. 342/124 |
| 5,070,730 | 12/1991 | Edvardsson ................. 73/290 V |

FOREIGN PATENT DOCUMENTS 150939 9/1981 Germany .
9012292 10/1990 WIPO .

Primary Examiner—William A. Cuchlinski, Jr.
Assistant Examiner—Willie Morris Worth
Attorney, Agent, or Firm—Cesari and McKenna

[57] ABSTRACT

A process for measuring the level of a liquid in a tank according to the radar principle, in which microwave energy is transmitted in the direction of the liquid level and the bottom of the tank from an antenna located above the liquid level, a measuring signal reflected from the liquid level is received by an antenna, and the liquid level may be determined from the transit time of the measuring signal, other signals than the measuring signals, i.e., spurious signals, in particular a bottom signal reflected on the bottom and which is usually relatively strong, being filtered out or otherwise taken into account by the measuring technique, and the actual distance between the antenna and the bottom of the tank (the actual bottom distance), being known, and the permittivity and permeability numbers for the liquid in the tank being at least approximately known, leads to reliable results in a way which is simpler with respect to analysis technique because of the fact that the transit time is determined for the bottom signal and an apparent bottom distance is determined from this transit time, and that from the ratio of the determined apparent bottom distance and the known actual bottom distance, the ratio of apparent to actual liquid level, and therefore the actual liquid level, is determined.

5 Claims, 1 Drawing Sheet

1

PROCESS FOR MEASURING THE LEVEL OF FLUID IN A TANK ACCORDING TO THE RADAR PRINCIPLE

BACKGROUND OF THE INVENTION

In accordance with this measurement process which is generally known, a microwave signal is transmitted in the direction of the liquid level and the bottom of the tank from a (sending) antenna mounted above the liquid level. A measuring signal reflected from the liquid level is received by the (sending) antenna or another antenna (receiving antenna), and the level of the liquid may be determined by the transit time determined for the measuring signal. Signals other than the measuring signal, i.e., spurious signals, in particular a generally relatively strong bottom signal reflected from the tank bottom is filtered out or otherwise taken into account in the measuring technique. The actual distance between the antenna and the bottom of the tank, i.e., the actual bottom distance, is known, and the permittivity and permeability numbers for the liquid in the tank are known at least approximately.

Besides being another process for measuring the level of a liquid in a tank, liquid measurement according to the radar principle is commonly used, in particular, for large tanks in tank farms or the like. The radar principle is based on the property of electromagnetic waves to propagate at a constant Speed within a homogeneous nonconducting medium, and to reflect a part of the energy at the interface of different media. The distance to an irradiated interface may be determined from the measured time difference which elapses between the transmitted and received waves of corresponding wavelengths. The electromagnetic waves have to be modulated in order to be able to measure the transit time between the transmission and return of the measuring signal at the transmission point. Pulse modulation is used particularly frequently. This has the advantage that a common transmitting and receiving antenna may be used, if during the transmission, the receiving branch is separated from the common waveguide by means of a sending/receiving dividing filter.

The radar principle may be implemented with electromagnetic waves of a wide frequency range; the frequency range is determined by different boundary conditions, which also and, in particular, include the area of application. The microwave range is convenient for measuring the level of a liquid in a tank. In addition to pulse modulation, frequency modulation of the microwave signal has also been used as a modulation mode in this area (FMCW radar). In this case, the modulation is realized not by means of pulses and pulse pauses, but with continuous emission of the microwave signal, by means of a frequency which increases mostly in sawtooth form with time and rebounds at the end of the rise.

The height of the level in the tank is calculated from the known internal height of the tank, i.e., the actual bottom distance between the antenna and the bottom of the tank, and the free space between the liquid level and the antenna. This distance may be determined with a known signal transit time and a known rate of propagation of the microwave signal from the measuring signal reflected from the liquid level.

Actually, the measuring signal is frequently greatly distorted. In particular, in the case of a liquid with a relatively low permittivity (for example, $\epsilon$, under 2, as, e.g., in the case of paraffin), the bulk of the microwave signal is not reflected from the liquid level interface, but from the normally conductive bottom of the tank. If the bottom signal is not entirely or mainly absorbed in the liquid, as in the case of a high filling level and/or high electric conductivity of the liquid, this presents a considerable technical problem for analysis. This problem becomes greater as the liquid level drops. What is more, other sources for spurious signals (scatterings) are also present, so that the spectral analysis of the received signal by measuring techniques frequently proves to be difficult. In any case, a considerable amount of filtering must be used.

SUMMARY OF THE INVENTION

The task of this invention is to perfect and further develop the known liquid level measuring procedure so that a technically simpler analysis will lead to reliable results.

Another object of the invention is to provide a liquid level measuring process which minimizes required filtering of the received signals.

Other objects will, in part, be obvious and will, in part, appear hereinafter.

The process of this invention is characterized by the fact that the transit time is also determined for the bottom signal, and that an apparent bottom distance is determined from this transit time, and that the ratio of apparent to actual liquid level is determined from the ratio of determined apparent bottom distance and known actual bottom distance, and from that ratio, the actual liquid level in the tank is determined by calculation. In accordance with the invention, the bottom signal actually representing the intrinsic spurious signal is evaluated by the measuring technique. Of course, it has been recognized that when the permittivity and permeability numbers of the liquid are known, this bottom signal contains the information concerning the path traveled in the liquid, and thus the information concerning the level of the liquid. Actually, the rate of propagation of the microwave signal in the liquid, corresponding to the permittivity and permeability numbers of the liquid, is slower than that above the level of the liquid, where in each case it is practically always possible to start with the factor 1. Mathematically, according to the theory described previously, we come from the apparent bottom distance, which is greater than the actual bottom distance because of the increased transit time of the microwave signal through the liquid, to the actual liquid level by means of the given ratio calculation.

There may be different possibilities for reproducing in a formula the mathematical analysis recited in claim 1; claim 2 presents a particularly useful analysis formula.

My process is of particular significance when it is combined with the long-known process of direct measurement of the measuring signal itself. On the one hand, this provides a double margin of safety; on the other hand, it provides for the possibility of obtaining correct results in the case where the permittivity and permeability numbers of the liquid are known only approximately. The procedure in this case is that in the spectrum of the received signals, i.e., measuring signal and spurious signal, one of the signals is identified as the measuring signal by means of the mathematically determined value for the actual liquid level. By means of correct identification of the measuring signal, the correct analysis, even in the case of an error band width for the permittivity and/or permeability numbers for the liquid, means that by taking account of the error band width of the permittivity and permeability numbers $\epsilon_r$ and $\mu_r$ and the bottom signal, the value for the actual liquid level is determined mathematically with a certain error band width, and this value is laid over the spectrum of the received signals, i.e., measuring signal and spurious signal, with this error band width as a recognition window.

My process is suitable for all types of measuring equipment based on the radar principle, in particular, both for frequency modulation equipment as well as for pulse modulation equipment.

BRIEF DESCRIPTION OF THE DRAWINGS

The invention is presented below by means of the accompanying explanatory drawing, in which.

DESCRIPTION OF PREFERRED EMBODIMENTS

Figure 1:
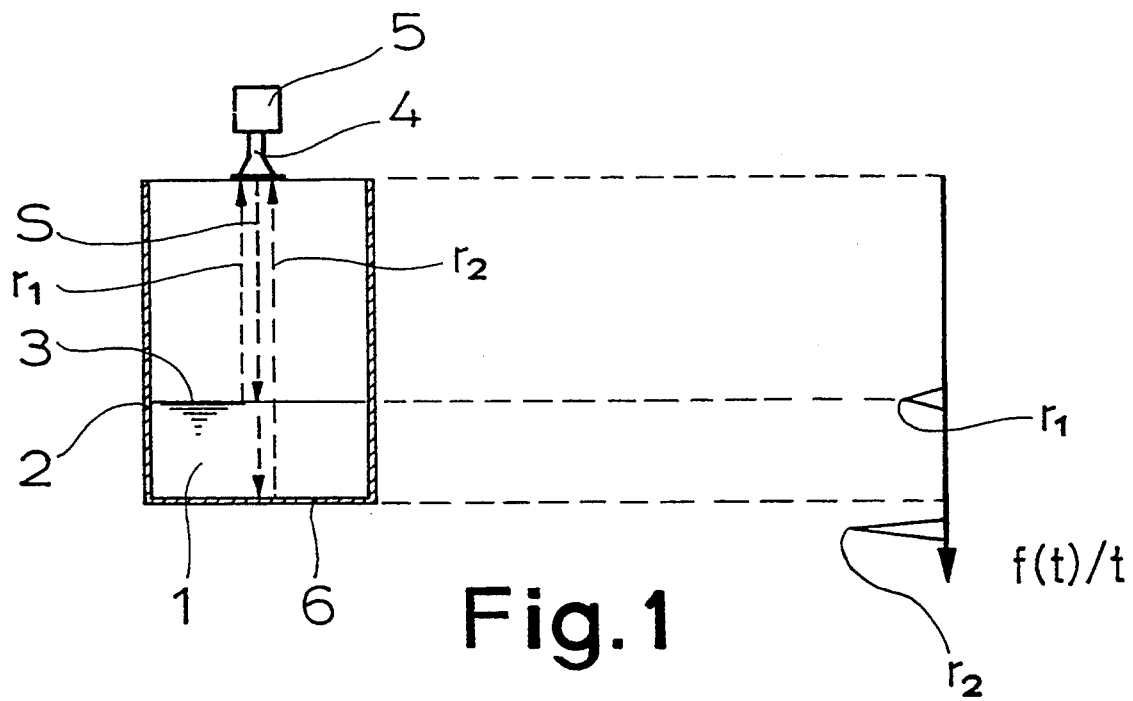
FIG. 1 on the left shows schematically the different signal behaviors in a tank partially filled with a liquid and, on the right, shows an associated signal analysis, and FIG. 2 on the left shows a representation corresponding to FIG. 1 for explaining the different parameters of the analysis equation of my process and, on the right, shows the principle of the signal analysis in the case of frequency modulation (FMCW radar).

The process for measuring the level of a liquid 1 in a tank 2 according to the radar principle is described by means of FIG. 1. In this process, a microwave signal is transmitted in the direction of the liquid level 3 and the bottom 6 of the tank 2 from an antenna 4 located above the liquid level 3, which is fed from a microwave generator 5 of conventional design. The transmitted microwave signal is identified by the reference symbol S and arrows directed downwards which indicate impact on the liquid level 3 and the bottom 6 of the tank 2.

A measuring signal $r_1$, is reflected from the liquid level 3 and received by the antenna 4 or, not shown here, a second antenna, i.e., a separate receiving antenna. The liquid level, i.e., the height of the liquid level 3 in the tank 2, is determined from the transit time determined for the measuring signal $r_1$. In any case, this is the normal procedure known from the prior art. The signal analysis is shown in FIG. 1 schematically on the right. Here one sees the signal peak for the measuring signal $r_1$ at a coordinate which represents the frequency modulation (FMCW radar) (the frequency varies time-dependently); in the case of the also common pulse modulation arrangement, it is simply a time coordinate.

Signals other than the measuring signal are viewed as spurious signals. This pertains, in particular, for the usually relatively strong bottom signal $r_2$ reflected from the tank bottom 6, which signal is plotted in FIG. 1 and may be seen on the right in FIG. 1 on the coordinate. This signal is either filtered out or taken into account by the measuring technique in any other way.

Figure 2:
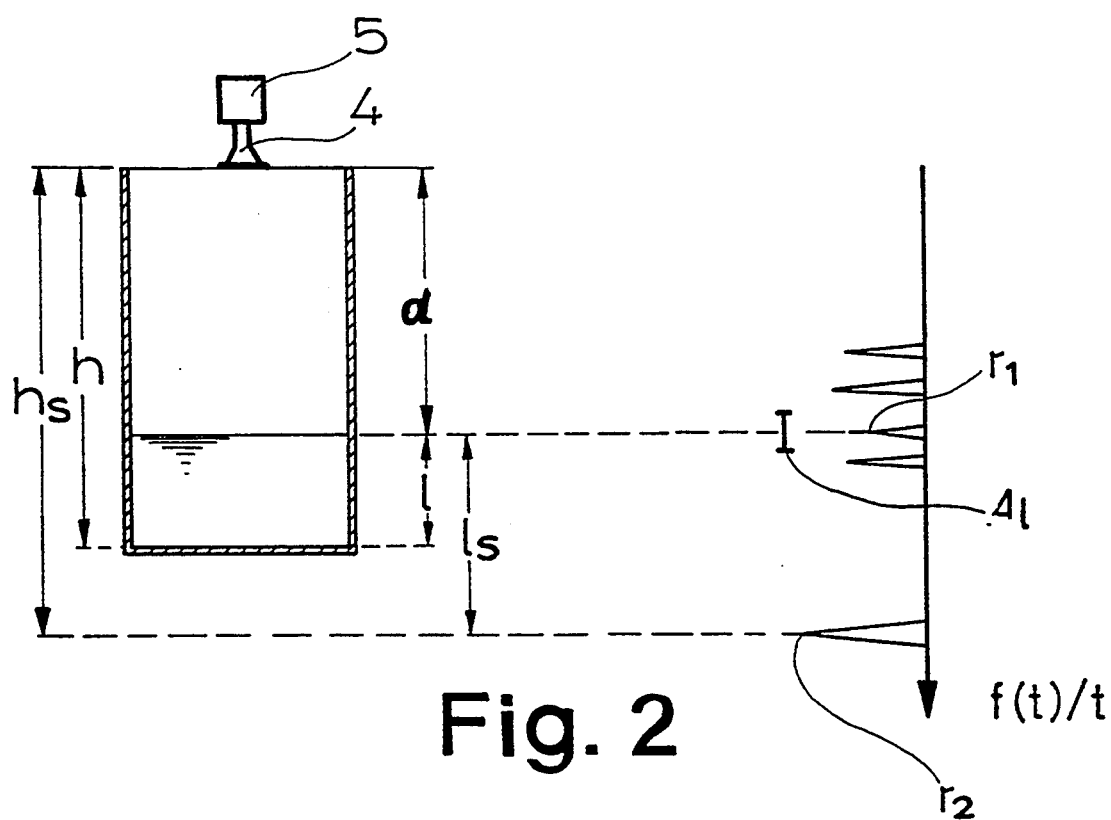

If one now assumes, which is an easy assumption to make, that the actual bottom distance, and therefore the distance of the bottom 6 of the tank 2 from the antenna 4 is known, i.e., the bottom distance h in FIG. 2, and if one further assumes that for the liquid 1 in the tank the permittivity number $\epsilon_r$ and the permeability number $\mu_r$ are known at least approximately, then with the procedure of this invention, one may measure and evaluate not the measuring signal $r_1$, or in any case not only the measuring signal $r_1$, but have recourse to the bottom signal $r_2$ alone, or in any case additionally as an information source. This has been explained above in the general part of the description and has been described additionally by means of FIG. 2. In that figure, d represents the free space above the liquid level 3, l is the actual liquid level and $l_s$ is the apparent liquid level, which results from the fact that the rate of propagation $c_\eta$ in the liquid 1 is less than the rate of propagation $c_1$ in the space above the liquid level 3, which is normally gas-filled, in particular, air filled.

According to the procedure of this invention, the transit time also is determined for the bottom signal $r_2$, and an apparent bottom distance $h_s$ is determined from this transit time. The ratio of apparent bottom distance $h_s$ to the actual bottom distance h may be inferred from the ratio of the apparent liquid level $l_s$ to the previously unknown actual liquid level l, since in both cases the free space d above the liquid level 3 may be considered as a constant. The ratio of apparent level $l_s$ to actual level l corresponds to the ratio of the rate of propagation $c_1$ above the liquid level 3 to the rate of propagation $c_\eta$ in the liquid 1. Again, according to physical laws, this ratio is equal to the root of the product of the permittivity and permeability numbers $\epsilon_r$ and $\mu_r$ of the liquid if deviations of $c_1$ in the gas above the liquid level 3 are ignored. The analysis equation, therefore, is as follows:

$$\frac{l_s}{l} = \frac{h_s - d}{h - d} = \frac{c_1}{c_{r1}} = \sqrt{\epsilon_r \mu_r} \tag{1}$$

In particular, this analysis is based on the consideration that the actual level l is the difference between the actual bottom distance h and the free space d above the liquid level 3. If one now can determine the free space d frown the equation given above, which is possible if one knows h, $\epsilon_r$ and $\mu_r$, then one may determine level l directly. The determination of d according to the following solution follows from the previous Equation (1):

$$h_s - d = \sqrt{\epsilon_r \mu_r} \, (h - d) \tag{2}$$

$$h_s - h\sqrt{\epsilon_r \mu_r} = d(1 - \sqrt{\epsilon_r \mu_r}) \tag{3}$$

$$d = h_s \frac{1}{1 - \sqrt{\epsilon_r \mu_r}} - h \frac{\sqrt{\epsilon_r \mu_r}}{1 - \sqrt{\epsilon_r \mu_r}} \tag{4}$$

Then one arrives at the desired level l by means of the final equation:

$$l = h - d \tag{5}$$

Therefore, in accordance with the above equations, the information contained in the bottom signal $r_2$ concerning the change in the transit time of the microwave signal in the liquid 1 is extracted, and from this the actual liquid level l is determined. This has the great advantage that the regularly relatively strong bottom signal $r_2$ may be analyzed, and the regularly relatively weak measuring signal r, in the spectrum of the received signal does not have to be filtered out. Therefore, the analysis technique is significantly simpler:

Therefore, in principle, in accordance with the invention, it is possible to determine the liquid level l from the bottom signal $r_2$ even if the measuring signal $r_1$ itself cannot be measured at all. However, in the process invented, the bottom signal $r_2$ may also be used for an additional margin of safety in determining the actual measuring signal $r_1$. This is performed by identifying one of the signals in the spectrum of the received signals, i.e., measuring signal and spurious signals, as the measuring signal $r_1$ by means of the mathematically determined value for the actual liquid level l. In practice, this process will acquire special significance particularly when the permittivity constant $\epsilon_r$ and/or the permeability constant $\mu_r$ of the liquid 1 is known only approximately. Then it is possible to proceed so that, taking account of the error band width of $\epsilon_r$ and $\mu_r$ and the bottom signal $r_2$, the value for the actual liquid level l is determined mathematically with a certain error band width and is laid over the spectrum of the actually received signals with this error band width as a recognition window. This is indicated in FIG. 2 on the right with the recognition window $\Delta_l$ into which now the actual measuring signal $r_1$ in the spectrum of the total received signals falls. For a very small measuring signal r, this is recognized as the "correct" signal in the spectrum since it falls within the recognition window $\Delta_l$.

The combined procedure explained above is particularly reliable. However, one naturally assumes that the measuring signal $r_1$ is actually detectable by the measuring technique. If this is so, the error band width may be taken into account by the analysis technique in the case of the value determined from the bottom signal $r_2$ which, in the first place, results from the fact that the permittivity number $\epsilon_r$ and/or the actual bottom distance h (more seldom the permeability number $\mu_r$) are not known precisely.

The actual bottom distance h may be determined normally by measuring the tank 2. Also, one may perform a reference measurement without liquid 1 in the tank 2 and from this, determine the actual bottom distance by means of a bottom signal $r_2$ reproducing the actual bottom distance. If the measuring signal $r_1$ itself may be detected in the spectrum easily, other parameters may be calculated from this, for example d and $h_s$. For this, the equations given above only have to be solved for different parameters.

FIGS. 1 and 2 show the process invented in the case of frequency modulation. However, corresponding analyses also are made in the case of pulse modulation. For understanding the frequency modulation for FIG. 2, it must be explained that the frequency position in the case of reflection from the tank bottom 6 with a fluid 1 in container 2 is at higher frequencies than in the case of an empty tank 2.

FIG. 2 also shows on the right the recognition window $\Delta_l$ which permits identification of the measuring signal $r_2$ from the spectrum of all received signals.

It will thus be seen that the objects set forth above are efficiently attained and, since certain changes may be made in carrying out the above process, it is intended that all matter contained in the above description or shown in the accompanying drawing shall be interpreted as illustrative and not in a limiting sense.

It is also to be understood that the following claims are intended to cover all of the generic and specific features of the invention described herein.

I claim:

1. In a process for measuring the level of liquid in a tank according to the radar principle in which a microwave signal is transmitted in the direction of the liquid level and the bottom of the tank from a transmitting antenna located above the liquid level, received signals including perhaps spurious signals, a measuring signal reflected from the liquid level and a bottom signal reflected from the bottom of the tank are received by a receiving antenna and the measuring and bottom signals from the receiving antenna are detected and processed by receiver means associated with the antenna, the actual distance between the transmitting antenna and the receiving antenna, respectively, and the tank bottom distance being known, and the permittivity and permeability numbers $\epsilon_r$ and $\mu_r$ for the liquid in the tank being known at least approximately, the steps of determining from said bottom signal the transit time for said bottom signal, and mathematically determining the actual liquid level in the tank at least approximately from said transit time, the known actual bottom distance and the at least approximately known permittivity and permeability numbers $\epsilon_r$ and $\mu_r$.

2. The process according to claim 1, wherein the mathematical determination is made according to the equation $$\frac{l_s}{l} = \frac{h_s - d}{h - d} = \frac{c_1}{c_{r1}} = \sqrt{\epsilon_r \mu_r}$$

$l_s$ being the apparent liquid level l being the actual liquid level, $h_s$ being the apparent bottom distance, h being the actual bottom distance, d being the free space above the liquid level, $c_1$ being the rate of propagation of the microwave signal in the air, $c_{r1}$ being the rate of propagation of microwave signal in the liquid, $\epsilon_r$ being the permittivity number of the liquid, and $\mu_r$ being the permeability number of the liquid.

3. The process according to claim 1 or 2, including the step of, in a spectrum of the received signals (measuring signal and spurious signals), identifying one of the signals as the measuring signal by means of the mathematically determined value for the actual liquid level.

4. The process according to claim 3, including the steps of:

by taking account of the error band widths of the permittivity and permeability numbers $\epsilon_r$ and $\mu_r$ and the bottom signal, determining mathematically the value for the actual liquid level with a certain error band width, wherein said certain error band width defines a recognition window for the measuring signal, and determining which of the received signals is within the recognition window.

5. The process according to claim 1 or 2, wherein the microwave signal transmitted by the transmitting antenna is modulated with pulse modulation or frequency modulation.

* * * * *